United States Patent [19]

Allen et al.

[11] Patent Number: 4,544,132

[45] Date of Patent: Oct. 1, 1985

[54] COMBINATION GLADHAND AND SHUTOFF VALVE

[75] Inventors: Charles S. Allen, River Forest; Arthur A. Berg, Northbrook; Eugene W. Schmitt, Lockport; Michael R. Stoltenberg, Des Plaines; Frederic Lissau, Chicago, all of Ill.

[73] Assignee: Sloan Valve Company, Franklin Park, Ill.

[21] Appl. No.: 470,232

[22] Filed: Feb. 28, 1983

[51] Int. Cl.[4] .............................................. F16K 1/00
[52] U.S. Cl. .................... 251/318; 251/252; 251/253; 251/320; 251/362
[58] Field of Search ................ 251/251–254, 251/362, 365, 320, 210, 318

[56] References Cited

U.S. PATENT DOCUMENTS

| 248,970 | 11/1881 | Whittaker | 251/252 X |
|---|---|---|---|
| 351,876 | 11/1886 | Marsh | 251/360 X |
| 492,168 | 2/1893 | Phillips | 251/253 |
| 558,541 | 4/1896 | Wetz et al. | 251/253 X |
| 858,497 | 7/1907 | Barnes | 251/253 |
| 1,884,442 | 10/1932 | Wells et al. | 251/210 |
| 2,061,703 | 11/1936 | Golden | 251/252 X |
| 3,155,367 | 11/1964 | Gifford | 251/86 |
| 3,165,293 | 1/1965 | McClure | 251/252 |
| 3,245,428 | 4/1966 | Klimak et al. | 137/493 |
| 3,396,938 | 8/1968 | Matsui | 251/251 X |
| 4,109,673 | 8/1978 | Horowitz et al. | 251/288 X |

FOREIGN PATENT DOCUMENTS

| 680682 | 8/1939 | Fed. Rep. of Germany | 251/210 |
|---|---|---|---|
| 92111 | 4/1938 | Sweden | 251/253 |

Primary Examiner—Samuel Scott
Assistant Examiner—Kenichi Okuno
Attorney, Agent, or Firm—Kinzer, Plyer, Dorn & McEachran

[57] ABSTRACT

A combination gladhand and shutoff valve for use in tractor and/or trailer applications has a gladhand body with an air inlet and an air outlet. A seal member is positioned at the air outlet and there is a chamber within the body which connects the inlet and outlet. A valve plug is movable within the chamber toward and away from the seal member along a path coaxial with the outlet and the seal member. The valve plug has portions thereon which cooperate with the seal member to close the outlet. A handle is located outside of the gladhand body and is operatively associated with the valve plug for effecting movement thereof between open and closed positions.

9 Claims, 10 Drawing Figures

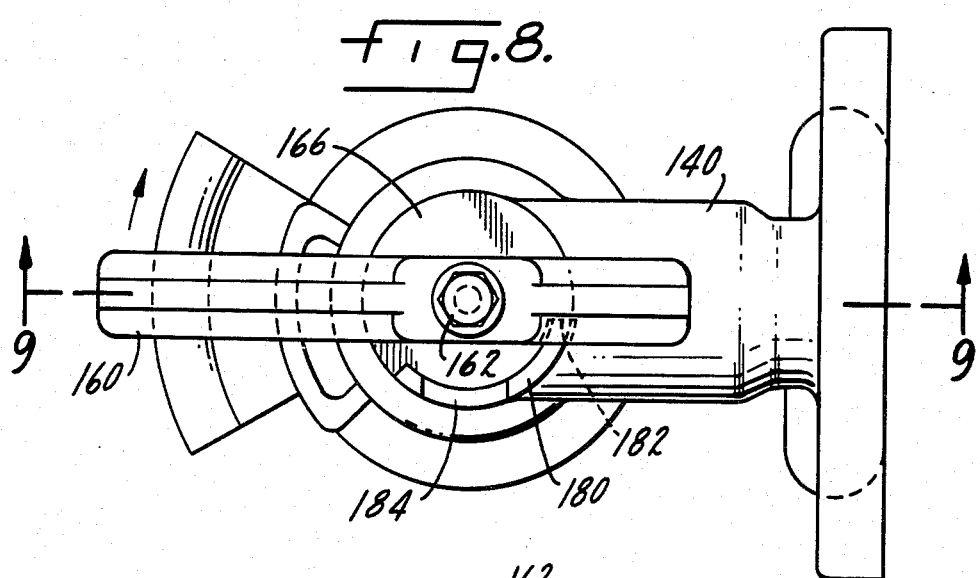
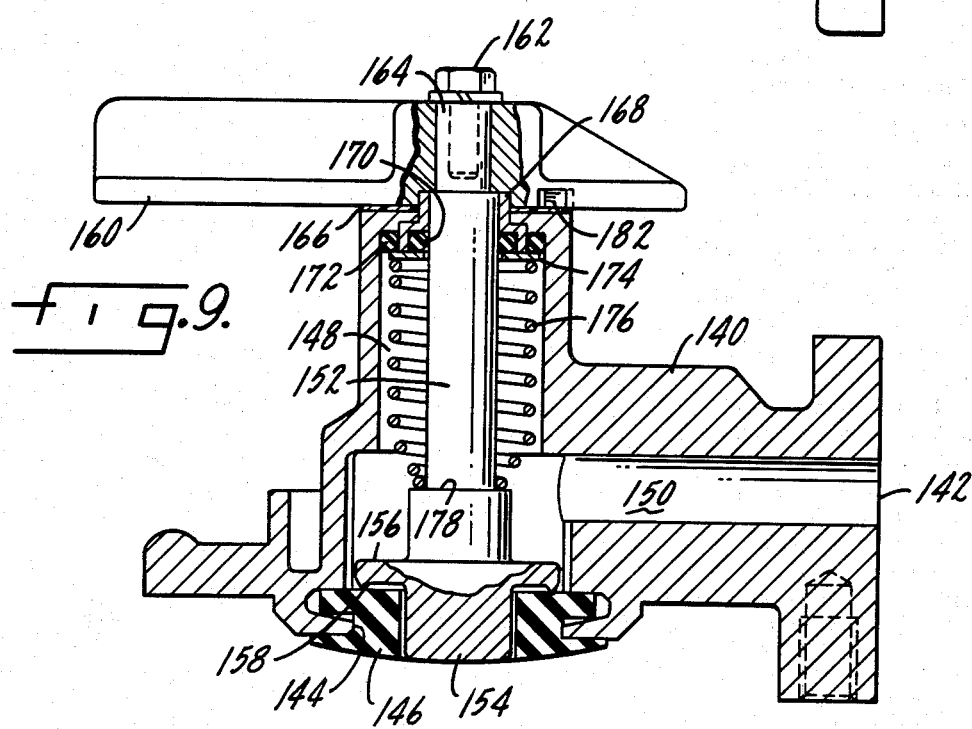
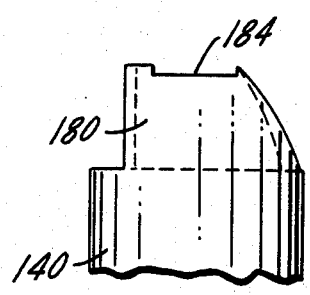

COMBINATION GLADHAND AND SHUTOFF VALVE

SUMMARY OF THE INVENTION

The present invention relates to gladhands of the type used in tractor and/or trailer applications and has particular application to a gladhand structure which includes a shutoff valve.

A primary purpose of the invention is a combination gladhand and shutoff valve in which the shutoff valve is positioned within the gladhand body and moves toward and away from a coaxially positioned gladhand seal.

Another purpose is a simply constructed reliably operable combination gladhand and shutoff valve.

Another purpose is a combination structure of the type described in which an exterior handle mounted on the gladhand body, slidably moves a valve plug within the gladhand body toward and away from the conventional gladhand seal.

Another purpose is a combination gladhand and shutoff valve of the type described which may be arranged either with or without a spring return for the slidable valve plug.

Other purposes will appear in the ensuing specification, drawings and claims.

BRIEF DESCRIPTION OF THE DRAWINGS

The invention is illustrated diagrammatically in the following drawings wherein:

FIG. 8 is a top plan view of a further modified form of the invention, FIG. 9 is a section along plane 9—9 of FIG. 8, and FIG. 10 is a partial side view of the gladhand body illustrating the ramp controlling movement of the shutoff valve.

DESCRIPTION OF THE PREFERRED EMBODIMENT

The present application describes a combination gladhand and shutoff valve which finds particular application in over-the-road vehicles and has utility as a part of the air system connecting a tractor to a trailer and/or connecting one trailer to a following trailer. In the trade the following trailer is known as a full trailer, whereas the trailer mounted upon a tractor is known as a semi-trailer. The gladhand construction shown has application within the air system of such vehicles and although only a portion of the gladhand construction is illustrated, it is well known in the art that there is a further fitting required in a complete gladhand construction. But for simplicity in description, only a portion of the gladhand construction is shown and described herein.

Reference is made to the following U.S. patents which illustrate similar types of gladhand constructions: 4,109,673, 3,960,365 and 3,245,428.

Figure 1:
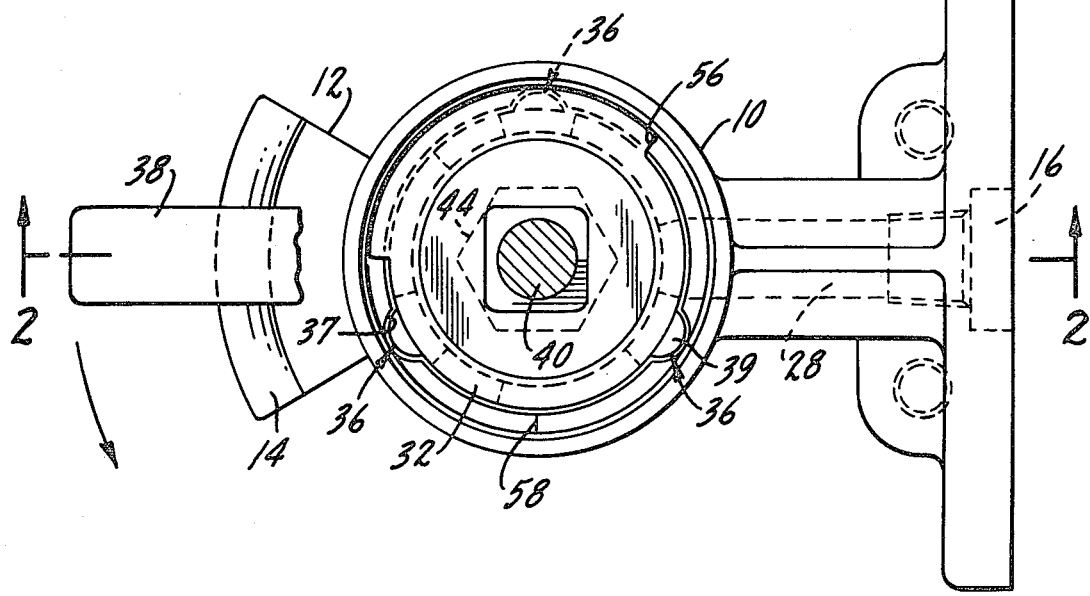
FIG. 1 is a plan view of one form of combination gladhand and shutoff valve, with parts removed and parts in section.
Figure 2:
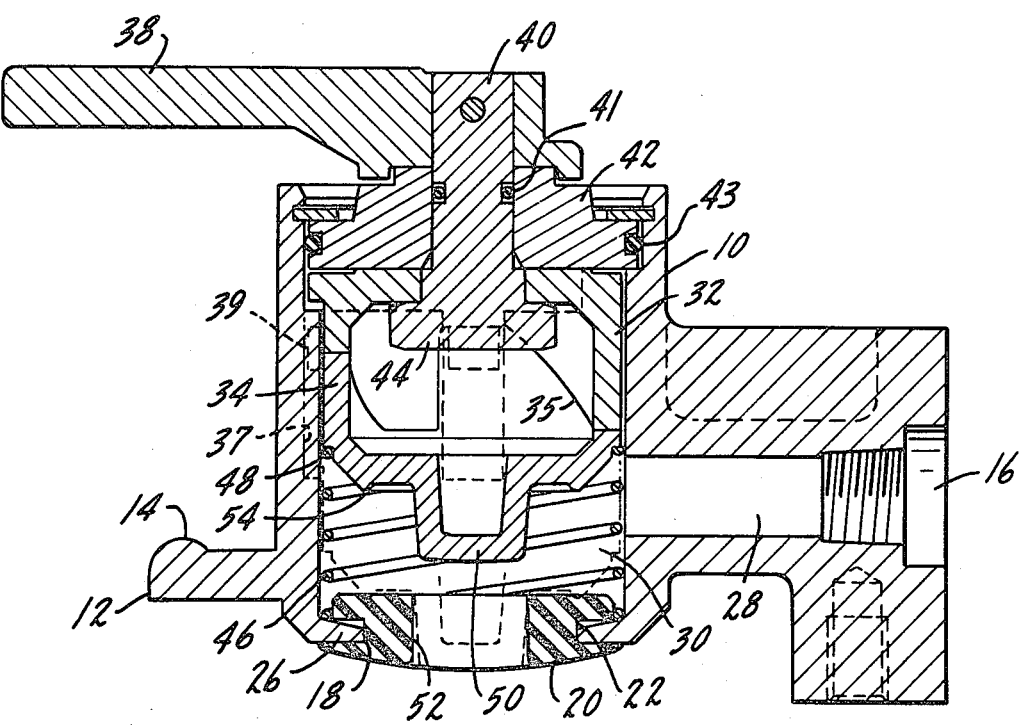
FIG. 2 is a section along plane 2—2 of FIG. 1.

In the construction of FIGS. 1 and 2, the gladhand includes a body 10 having an outwardly extending flange 12 with a cam surface 14. Surface 14 will cooperate with a similar gladhand structure which forms the other part of the overall gladhand construction. Thus, two elements, body 10 and the portion of the gladhand construction not shown, together form a coupling for two air hoses whereby the air supply on the tractor may be coupled to the semi-trailer or the semi-trailer may be coupled to the full trailer.

Body 10 has an air inlet passage 16 and an air outlet 18. A seal member 20 is positioned in air outlet 18 and takes the conventional form of seals used in gladhand constructions. Seal 20 may have a peripheral slot 22 within which is received a flange 26 of body 10. In some constructions there may be a second casting flange to more firmly hold the gladhand seal in position, thus eliminating the need for slot 22.

Inlet 16 communicates, through a passage 28, with a chamber 30 which in turn is in communication with air outlet 18. Positioned within chamber 30 is a drive member 32 and a movable valve plug 34. The plug and drive member have mating and cooperating cam surfaces, with the line defining these cam surfaces being indicated at 35. The cam surfaces form a ramp whereby rotation of drive member 32, as described hereinafter, will cause the valve plug to slidably move within chamber 30. Valve plug 34 is prevented from rotation by one or more key connections 36 each of which consists of a slot 37 formed in the side of chamber 30 and an outwardly extending projection 39 on the valve plug.

A handle 38 is positioned exteriorly of body 10 and has a shaft 40 attached thereto, which shaft extends through a closure element 42 into the interior of chamber 30. A seal 41 is positioned between shaft 40 and element 42 and a seal 43 is positioned between element 42 and body 10. Shaft 40 may carry a head or the like 44 which is used in holding the shaft to drive member 32. Thus, rotation of the handle will cause rotation of shaft 40 which in turn will rotate drive member 32 and thus cause slidable coaxial movement of valve plug 34 as described.

Positioned within chamber 30 is a coil spring 46 which, as shown, has one end bottomed against flange 26 and the other end positioned against a shoulder 48 on valve plug 34. The spring may be bottomed against any support within the chamber. Thus, coil spring 46 functions as a return spring and moves valve plug 34 away from seal member 20 when the handle 38 is turned to open the valve. In the structure shown in the drawings, coil spring 46 is directly within the path of air flow from passage 28 to air outlet 18. It may be otherwise. The spring may be positioned along the side of the valve plug in such a way as it is not within the path of flow and thus does not form a restriction to such flow.

Valve plug 34 may have an outwardly extending nose 50 which has a size and shape to permit it to penetrate an opening 52 in seal 20. The nose may be in sealing contact with the seal or it may be slightly undersize so as not to form a seal at this point, but only to serve as a positioning or partial closing element. In such event, valve plug 34 also includes a bead or peripherally or circumferentially extending rim 54 which is positioned for sealing contact, as indicated in dotted lines in FIG. 2, with a surface of seal 20 and generally in alignment with flange 26. Thus, the actual seal between the valve plug and seal member 20 may be by bead 54 rather than by nose 50. In the alternative, both elements may perform a sealing function. It is important for the area of seal contact between rim 54 and seal member 20 to be supported or backed up by flange 26 so that the closure of the valve plug upon the seal will not force the seal outwardly from air opening 18.

In operation, the open position of the combination gladhand and shutoff valve is illustrated in FIG. 2 in full lines. Upon rotation of handle 38 between stops 56 and 58, the mating cam surfaces between drive member 32 and valve plug 34 will cause the valve plug to slidably move toward the valve closed position indicated in dotted lines in FIG. 2. When handle 38 is rotated in the opposite direction, to open the valve, return spring 46 will cause the valve plug to move back to the full line open position of FIG. 2.

Figure 3:
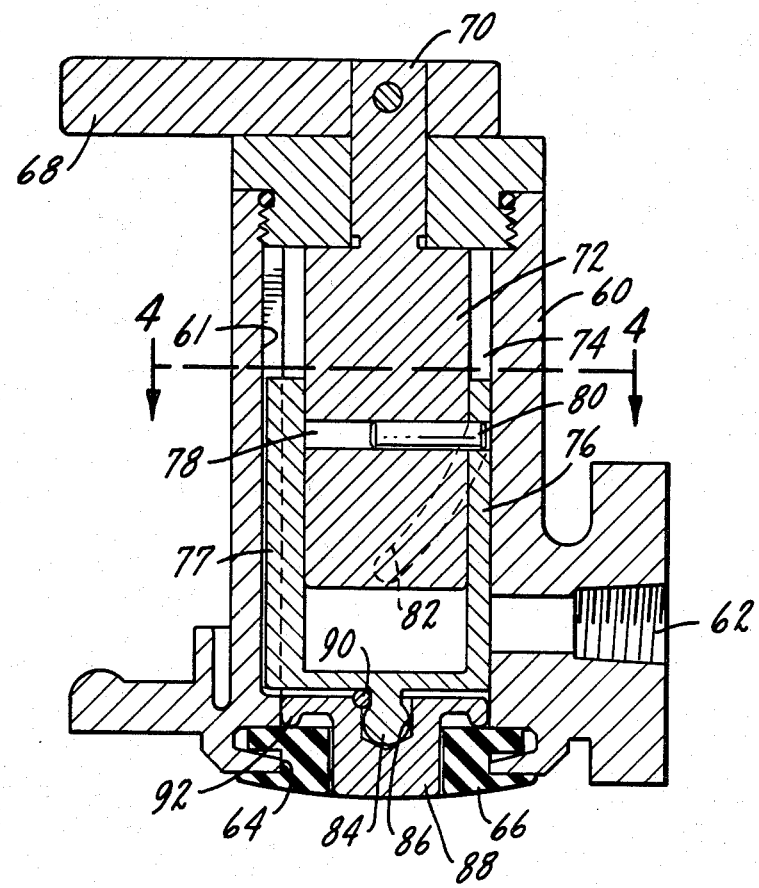
FIG. 3 is a section, similar to FIG. 2, but illustrating a modified form of gladhand and shutoff valve construction.
Figure 4:
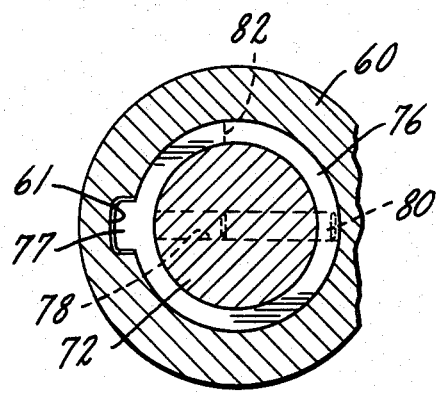
FIG. 4 is a section along plane 4—4 of FIG. 3.

In the construction of FIGS. 3 and 4, the gladhand body is indicated at 60 and has an air inlet 62 and an air outlet 64. A seal 66 is positioned within air outlet 64, as described earlier. A handle 68 is attached to a shaft 70 which has a drive member portion 72 extending within chamber 74 formed in body 60. A valve plug 76 is positioned within chamber 74 and drive member 72 extends within the valve plug. Valve plug 76 has a key 77 extending outwardly into a keyway 61 formed on the inside of body 60. Drive member 72 may have a cross slot 78 carrying a projection or the like 80 which projection extends outwardly therefrom and into a diagonal slot 82 formed in valve member 76. Thus, rotation of handle 68 will rotate drive member 72 which, through the described pin and slot connection, will cause coaxial movement of valve plug 76. In the FIGS. 3 and 4 form of the invention there is no return spring, as the positive connection between the valve plug and the drive member functions to move the valve plug both toward and away from a valve closing position. Although not shown, it should be understood that FIG. 3 and all subsequent forms of the invention will include seal means similar to element 41 and 43 of FIGS. 1 and 2.

One version of the method by which the effect of misalignment between the seal member and valve plug is minimized is illustrated in the FIGS. 3 and 4 construction. At the end of valve plug 76 there is a projection which is in the form of a ball member 84 which extends into a cooperating socket or recess 86 in a nose member 88. The nose member actually forms the seal or provides the sealing contact with seal 66. A pin or the like 90 may be used to positively connect ball member 84 into the socket 86 of nose member 88.

Nose member 88 has an outwardly extending rim or lip 92 which may provide the sealing contact between the valve plug and seal 66, as described earlier. Again, the sealing contact or valve closing seal may be provided by both the seal rim and the nose or, in the alternative, by one or the other.

Of advantage in the construction of FIGS. 3 and 4 is that the valve plug is both self-centering and equalizing in that the sealing pressure provided by the plug, particularly through use of rim 92, is equally distributed about the area where the rim contacts the seal member.

Figure 5:
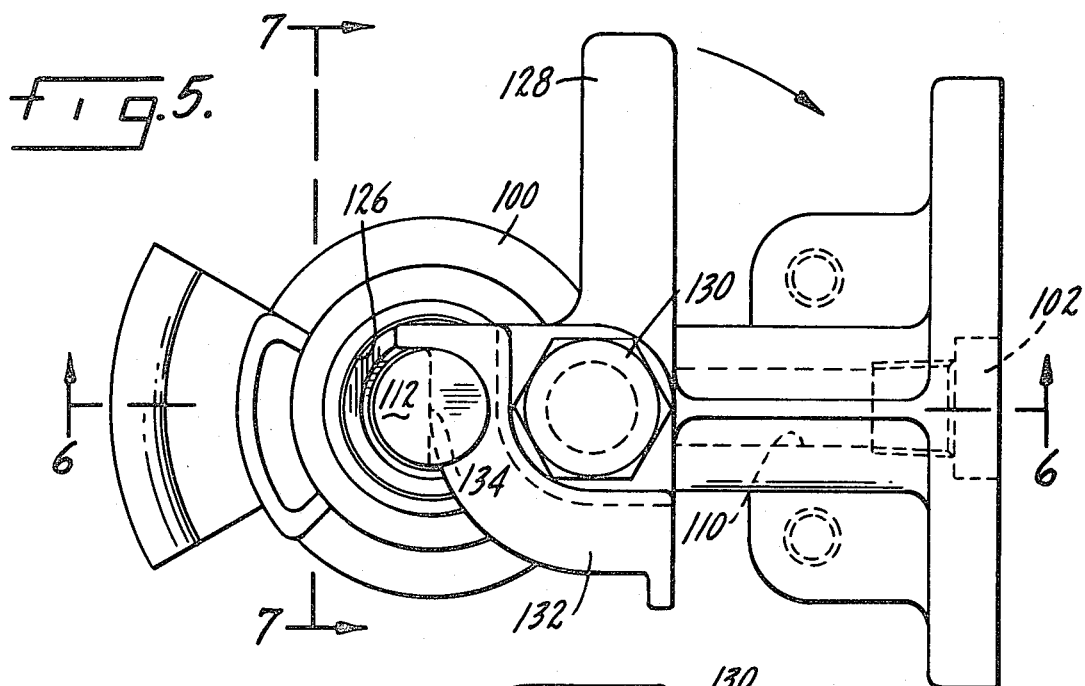
FIG. 5 is a plan view of yet a further form of gladhand structure.
Figure 6:
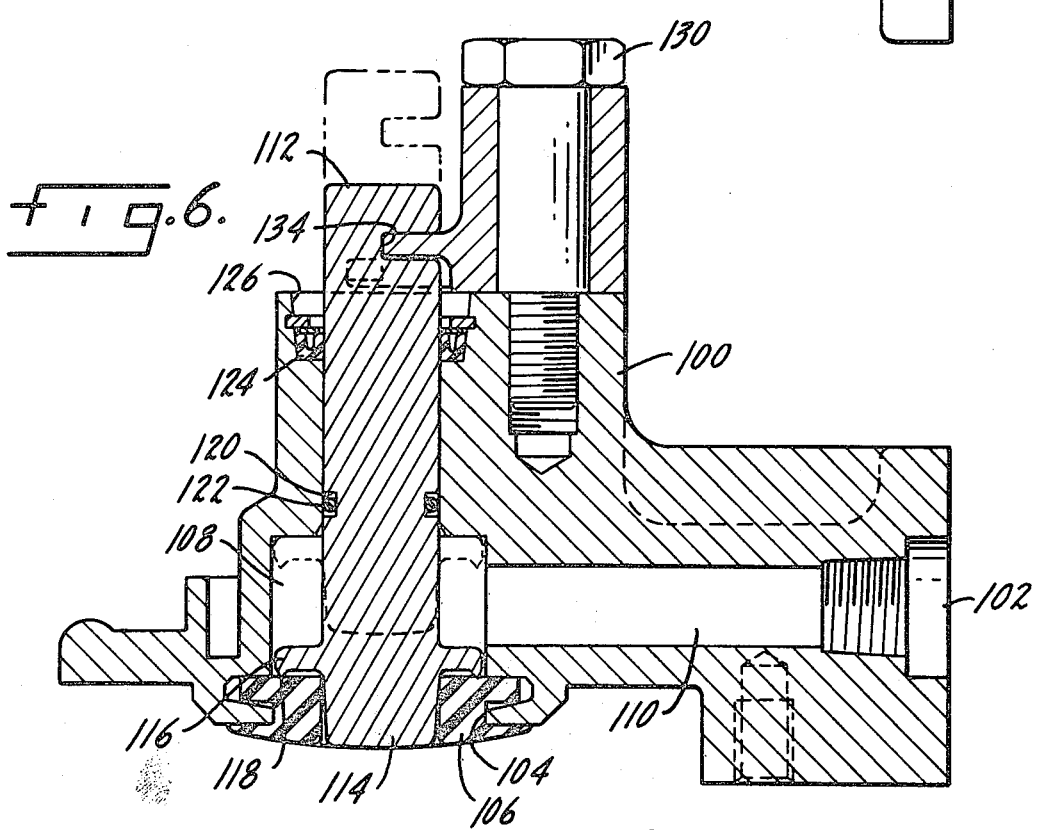
FIG. 6 is a section along plane 6—6 of FIG. 5.
Figure 7:
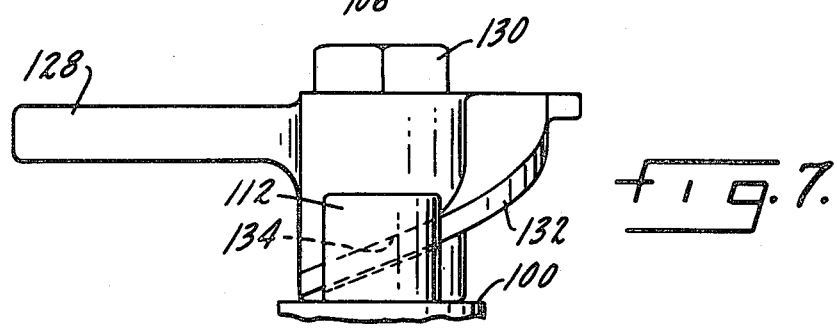
FIG. 7 is a partial view along plane 7—7 of FIG. 5.

In the construction of FIGS. 5, 6 and 7, a body is indicated at 100 and has an air inlet 102 and an air outlet 104 and a gladhand seal member 106 for use in closing the air outlet. A chamber 108 is formed within body 100 and is connected with air inlet 102 by a passage 110.

A valve plug 112 has a nose portion 114, which may be of the floating type, and an outwardly extending flange 116 which provides a sealing rim 118. Plug 112 is movable coaxially, as in the other forms of the invention, toward and away from the passage in the seal member, thereby performing a valve closing function. Valve plug 112 may have a first groove 120 containing a seal ring 122 which prevents air from within the gladhand from leaking outwardly. A wiping seal 124 may be positioned within a body groove 126 surrounding valve plug 112 to prevent dirt and other contaminants from reaching the interior of the gladhand. Similar seals may be used in the other embodiments disclosed herein. In the past, in some gladhand constructions, moisture has seeped in along the surface of mating metal parts causing corrosion and a freezing of the metal parts. The wiping seal is effective to prevent any moisture from reaching the interior mating metal surfaces of the gladhand and valve member.

Mounted exteriorly on body 100 is a handle 128 which is attached by a screw or the like 130 to the exterior of gladhand body 100. Handle 128 carries a diagonal or slanted cam or ramp surface 132 which extends into a groove 134 on valve plug 112. Groove 134 has a slanted or ramp or cam surface mating that of surface 132 whereby rotation of handle 128, through the cooperating cam surfaces on the valve plug and the handle, will cause the valve plug to coaxially move within the chamber in the gladhand body toward and away from valve closing and opening positions. Although a key and keyway construction between the valve plug and the gladhand housing or body are not illustrated in the FIGS. 5, 6 and 7 construction, such may be added, if desired. In general, the mating cam or ramp surfaces will cause longitudinal or coaxial movement of the valve plug in response to rotary movement of handle 128.

In the construction of FIGS. 8, 9 and 10, a body is indicated at 140 and has an air inlet 142 and an air outlet 144 and a gladhand seal member 146 for use in closing the air outlet. A chamber 148 is formed within body 140 and is connected with air inlet 142 by a passage 150.

A valve plug 152 has a nose portion 154, which again may be of the floating type, and an outwardly-extending flange 156 which may provide a sealing rim 158. Valve plug 152 is movable coaxially, as in the other forms of the invention, toward and away from the central and coaxially-arranged passage in the seal member, thereby performing a valve closing function.

A handle 160 is positioned outside of body 140 and is fixed to valve plug 152 by a fastener 162 which is engaged to a stem portion 164 of valve plug 152. A washer 166 may seat upon the exterior surface of body 140 and may be formed of a synthetic material such as Teflon or the like to provide a smooth bearing surface for rotation of handle 160 relative to the body. There is a collar 168 positioned within the opening of the body accomodating the outwardly-extending portion of the valve plug and the collar may seat an internal seal 170 and an external seal 172. Seal 170 seals to the exterior of plug 152 and seal 172 seals to the interior of the body. A small washer or seat member 174 may hold both of the seals in position and itself forms the seat for a coil spring 176, the opposite end of which is reduced in diameter and bears against a shoulder 178 of valve plug 152. Thus, as illustrated particularly in FIG. 9, spring 176 is effective to urge valve plug 152 to the closing position.

The external surface of body 140 adjacent the area where valve plug 152 extends outwardly therefrom has a ramp-like surface illustrated particularly in FIG. 10. The ramp is indicated at 180 and cooperates with a camming slot 182 in handle 160. Accordingly, when handle 160 is rotated in the direction of the arrow of FIG. 8, the handle will not only pivot about valve plug 152, but will be axially moved away from body 140 to thereby withdraw valve plug 152 from the closed position of FIG. 9 to an open position in which there is communication between the inlet 142 and the outlet 144. There is a notch 184 in the exterior surface of body 140 adjacent the ramp whereby the handle is rotated through a predetermined arc, after which its slot or groove 182 will fit within notch 184. This will hold the valve plug in an open position, which position will have handle 160 spaced outwardly from body 140. Handle 160 must initially be moved outwardly so as to release it from the notched and slot or groove arrangement described, after which spring 176 will return the valve plug and thus the handle to the original closed position of FIG. 9.

The invention is particularly useful in the tractor-trailer environment described, although it has applications in other transportation environments. The gladhand seals which are shown are conventional gladhand seals. The present invention is particularly important in that it uses the conventional glad-hand seal to also perform the valve closing function when a shut-off valve or shutoff cock is integrally formed with the gladhand.

Thus, a valve plug is movable coaxially toward and away from valve closing positions and movement of the plug may be provided by an exterior rotatable handle through the various mechanical constructions described. The valve plug may be an integral single member as shown in the FIGS. 1, 2, 5, 6, 7, 8, 9, and 10 constructions, or it may have a separate independently mounted nose member, as illustrated in FIG. 3. There may be a return spring or rotation of the handle may be effective to cause the valve plug to move both toward and away from the valve closing seal.

Whereas the preferred form of the invention has been shown and described herein, it should be realized that there may be many modifications, substitutions and alterations thereto.

The embodiments of the invention in which an exclusive property or privilege is claimed are defined as follows:

1. A combination gladhand and shutoff valve for use in gladhand coupling applications including a gladhand body having an air inlet and an air outlet, a seal member positioned at said air outlet and having a central passage therein, said seal member being attached to said gladhand body and having a portion thereof positioned exteriorly thereof so as to form a seal with a mating gladhand fitting, a chamber within said body connecting said inlet and outlet, a valve plug movable within said chamber toward and away from said seal member along a path coaxial with said outlet and seal member, said valve plug including a body portion and a nose member mounted thereon, said nose member being movable relative to said body portion to insure alignment of the nose member and the seal member passage when the valve plug is moved to a valve closing position, said valve plug nose member further including a circumferential rim positioned for contact with said seal member radially outside of said central passage to form a seal between said seal member and valve plug in the valve closing position.

2. The structure of claim 1 further characterized in that said valve plug nose member has a nose portion which is positioned within said passage when said valve plug is in a valve closing position.

3. A combination gladhand and shutoff valve for use in gladhand coupling applications including a gladhand body having an air inlet and an air outlet, a seal member positioned at said air outlet and having a central passage therein, said seal member being attached to said gladhand body and having a portion thereof positioned exteriorly thereof so as to form a seal with a mating gladhand fitting, a chamber within said body connecting said inlet and outlet, a valve plug movable within said chamber toward and away from said seal member along a path coaxial with said outlet and seal member, said valve plug including a circumferential rim positioned for contact with said seal member radially outside of said central passage to form a seal between said seal member and valve plug in a valve closed position, said valve plug being slidably movable within said chamber, with said valve plug being keyed to said chamber to prevent rotary movement of said valve plug, and handle means located outside of said body and operatively associated with said valve plug for effecting movement thereof between valve open and closed positions.

4. The structure of claim 3 further characterized in that said handle means includes a drive member positioned within said chamber and having means thereon in cooperative engagement with said valve plug whereby rotation of said handle means drive member causes said valve plug to slidably move toward and away from said seal member.

5. The structure of claim 4 further characterized in that said drive member and valve plug have mating cam surfaces thereon whereby rotation of said drive member slidably moves said valve plug, and a return spring positioned within said chamber and effective to return said valve plug toward said drive member when said drive member is moved by said handle means to said valve open position.

6. The structure of claim 4 further characterized in that said drive member extends within said valve plug, the cooperative engagement between said drive member and valve plug including an outwardly extending projection on said drive member and a diagonal slot on said valve plug.

7. The structure of claim 6 further characterized in that said outwardly extending projection on said drive member is formed by a pin positioned within a bore in said drive member and extending outwardly therefrom.

8. A combination gladhand and shutoff valve for use in gladhand coupling applications including a gladhand body having an air inlet and an air outlet, a seal member positioned at said air outlet and having a central passage therein, said seal member being attached to said gladhand body and having a portion thereof positioned exteriorly thereof so as to form a seal with a mating gladhand fitting, a chamber within said body connecting said inlet and outlet, a valve plug movable within said chamber toward and away from said seal member along a path coaxial with said outlet and seal member, said valve plug including a circumferential rim positioned for contact with said seal member radially outside of said central passage to form a seal between said seal member and valve plug, handle means located outside of said body and operatively associated with said valve plug for effecting movement thereof between valve open and closed positions, said valve plug extending outwardly from said body in said valve closed position, and mating cam surfaces on said valve plug and handle means to effect slidable movement of said valve plug within said chamber upon rotation of said handle means.

9. The structure of claim 8 further characterized by and including a wiping seal positioned between said chamber and said valve plug to prevent contaminants from reaching the interior of said body.

* * * * *